(12) United States Patent
Li et al.

(10) Patent No.: US 7,429,738 B2
(45) Date of Patent: Sep. 30, 2008

(54) SOLID STATE DETECTOR MODULE STRUCTURE AND RADIATION IMAGING SYSTEM

(75) Inventors: Yuanjing Li, Beijing (CN); Qingjun Zhang, Beijing (CN); Shuqing Zhao, Beijing (CN); Zhude Dai, Beijing (CN); Nianming Jiang, Beijing (CN); Qitian Miao, Beijing (CN); Zhijun Li, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 11/593,179

(22) Filed: Nov. 3, 2006

(65) Prior Publication Data

US 2007/0096030 A1    May 3, 2007

(30) Foreign Application Priority Data

Nov. 3, 2005    (CN) .................... 2005 1 0086766

(51) Int. Cl.
*H01L 25/00* (2006.01)
(52) U.S. Cl. ................................. 250/370.09
(58) Field of Classification Search ............. 250/370.09
See application file for complete search history.

(56) References Cited

U.S. PATENT DOCUMENTS

2002/0064252 A1* 5/2002 Igarashi et al. ................ 378/19

2003/0205675 A1* 11/2003 Nelson et al. .......... 250/370.09

FOREIGN PATENT DOCUMENTS

CN    2004-20009317.3    9/2004

OTHER PUBLICATIONS

English translation of the Abstract (only) for CN-2004-20009317.3, dated Sep. 14, 2004 (1 page).

* cited by examiner

*Primary Examiner*—David P. Porta
*Assistant Examiner*—Marcus H Taningco
(74) *Attorney, Agent, or Firm*—Osha • Liang LLP

(57) ABSTRACT

The present invention discloses a solid state detector module structure, comprising: an upper support plate and a lower support plate provided opposing to each other, a collimator provided between the upper support plate and the lower support plate for collimating the incident rays; and solid state detector arrays provided between the upper support plate and the lower support plate at the rear side of the collimator in the transmitting direction of the rays, wherein the solid state detector arrays comprises an upper and lower rows, with the upper row of the solid state detector array fixed under the upper support plate, and the lower row thereof fixed on the lower support plate. The present invention further discloses a radiation imaging system having the same. The solid state detector module structure of present invention decreases the scattering of ray beams, increases the capabilities of scattering resistance and the definition of image and enhances inspection speed compared with prior art.

12 Claims, 3 Drawing Sheets

SOLID STATE DETECTOR MODULE STRUCTURE AND RADIATION IMAGING SYSTEM

BACKGROUND OF THE INVENTION

1. Field of the Invention

Various embodiments of the present invention relates to a solid state detector module structure and a radiation imaging system having the same.

2. Description of the Related Art

Generally, a solid state detector module structure for radiation imaging in prior art has the advantages of small volume, easiness of assembly and maintenance, and less radiation of rays for circuits at front end etc. However, there is still a need for the enhancement of inspection speed of an inspection system. For increasing the inspection speed in the inspection system, the dimensions of the detectors in the detector array are enlarged for single-array detectors, or the beam-exit frequency of an electron accelerator is increased for accelerating the inspection. However, in real application, there is a limit for the enhancement of the frequency of the accelerator. And arbitrary increase of the dimension of the detectors may decrease the space resolution of the detection system, affecting the definition of imaging.

SUMMARY OF THE INVENTION

The present invention has been made to overcome the above-mentioned disadvantages. Accordingly, the present invention provides a solid state detector module, which may increase the inspection speed and enhance the capabilities of resisting scattering of rays along the radiation surface of the ray beams while the space resolution of the inspection system is not degraded. In addition, the dimension can be completely compatible with the single solid state detector array, which is convenient for enhancing the inspection speed of the radiation imaging system. The present invention further provides a radiation imaging system having the solid state detector module.

To achieve the above-mentioned object, the technical solution of the present invention is provided as the following:

A solid state detector module structure is provided, which comprises an upper support plate and a lower support plate provided opposing to each other, a collimator provided between the upper support plate and the lower support plate for collimating the incident rays; and solid state detector arrays provided between the upper support plate and the lower support plate at the rear side of the collimator in the transmitting direction of the rays, wherein the solid state detector arrays comprises an upper and lower rows, with the upper row of the solid state detector array fixed under the upper support plate and the lower row thereof fixed on the lower support plate.

In the solid state detector module structure of the present invention, the collimator comprises: an upper groove plate and a lower groove plate, with a side of each upper and lower groove plate being engaged with the upper and lower support plates respectively, and the other side thereof provided with mounting grooves; and a plurality of septa provided between the upper and lower groove plates via the mounting grooves.

In the solid state detector module structure of the present invention, the number of intervals formed by the septa is in correspondence to that of the detectors in the upper and lower rows of solid state detector arrays; when an angle between an incident rays and the detectors is zero, the spaces formed by the septa in the transmitting direction of the rays are in correspondence to the detector sensitive areas at the rear side, with the septa per se being corresponding to the dead areas of the detectors while not blocking the sensitive areas.

According to an aspect of the present invention, the solid state detector module structure further includes: a base plate; a front pillar and a rear pillar for coupling the upper and lower support plates to the base plate.

According to an aspect of the present invention, the solid state detector module structure further includes: a casing provided on the rear pillar; a bracket provided in the casing; and a circuit board provided on the bracket.

According to an aspect of the present invention, the solid state detector module structure further includes: an upper cover plate for covering the upper portion of the casing.

In the solid state detector module structure of the present invention, the rear end face of the casing is provided with a rear cover for the convenience of assembling/disassembling of components in the casing.

In the solid state detector module structure of the present invention, a lead plate for shielding is provided between the inner wall of the casing and the bracket.

According to another aspect of the present invention, a radiation imaging system is provided, comprising any one of aforementioned solid state detector module structures.

By the aforementioned configuration of the present invention, it is convenient for assembling and disassembling the circuit board in the casing. And it is also the case for the connection of the detector plate with the front end circuit board as well as the fixing of the casing with the base plate. In addition, the inspection speed of the radiation imaging inspection system is greatly enhanced by adopting a double array solid state detector without decreasing the space resolution thereof. Since a collimator is provided at the front edge of the detector, it is possible to use a collimator with materials of different length for ray with different energy, and the damage to an optoelectronic diode as well as the scattering of the ray beams is decreased. And since the front end circuit board is not provided at a beam flow plane of the rays, the radiation to the circuit at the front of the rays is also decreased, enhancing the life span of the detector module. The solid state detector module structure of present invention decreases the scattering of ray beams, increases the capabilities of scattering resistance and the definition of image, and enhances inspection speed compared with prior art. And it is advantageous for an application of a radiation inspection system with high energy X rays which does not have a rear collimator.

BRIEF DESCRIPTION OF THE DRAWINGS

The above and other objects, and features, and advantages of certain embodiments of the invention will be more apparent from the following description taken in conjunction with the accompanying drawings, in which.

Figure 1:
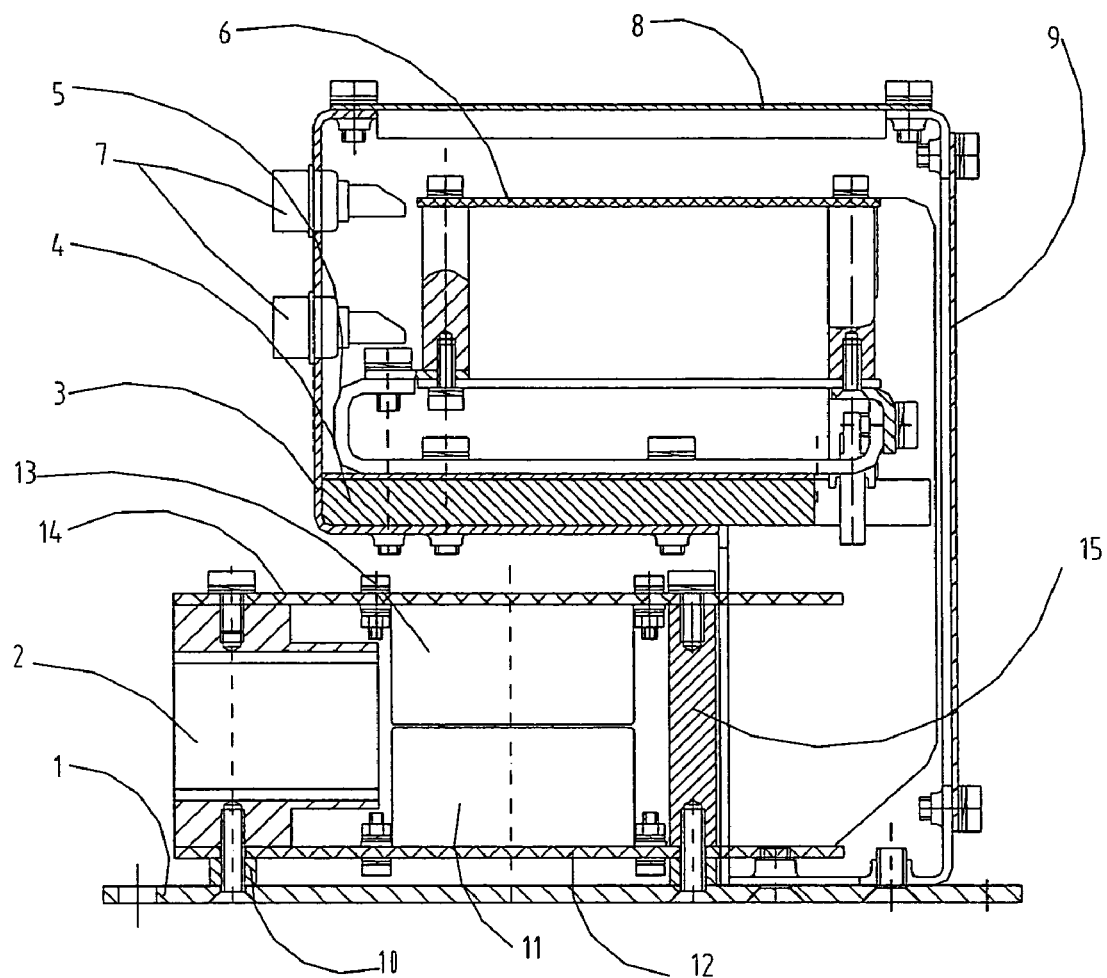
FIG. 1 is a structural sectional view of the present invention.

Hereinafter, the present invention will be further described in detail with reference to an embodiment thereof in connection with the annexed drawings.

DETAILED DESCRIPTION OF THE PREFERRED EMBODIMENT

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

Figure 2:
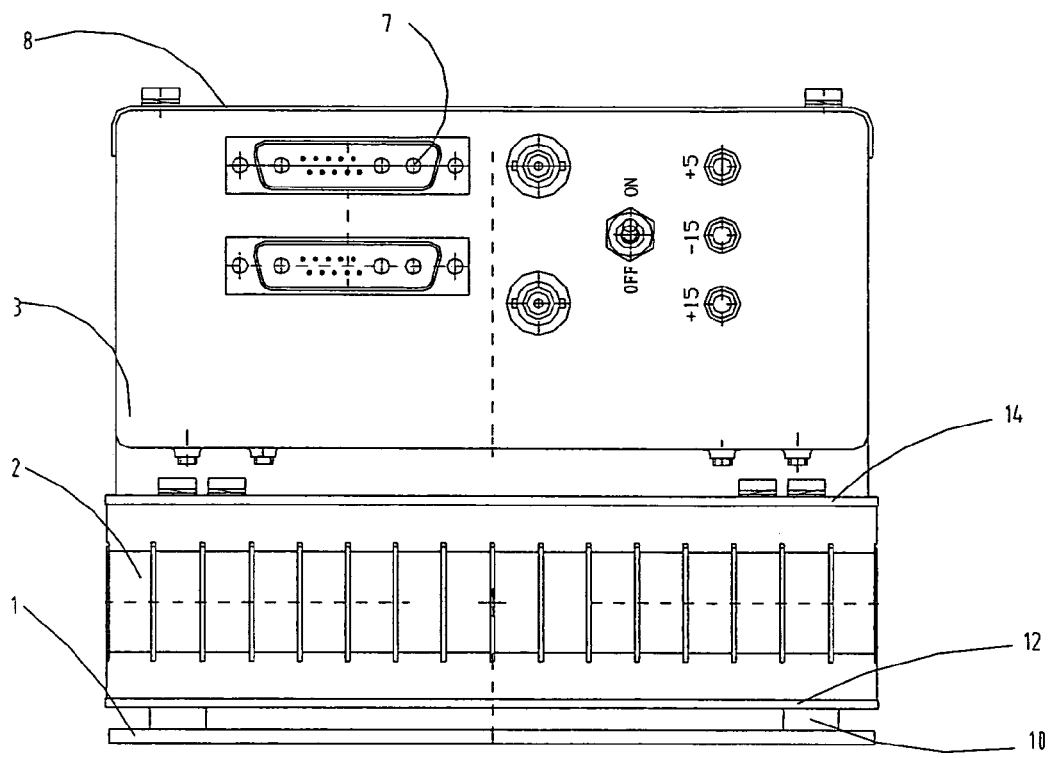
FIG. 2 is a left side view of FIG. 1.
Figure 3:
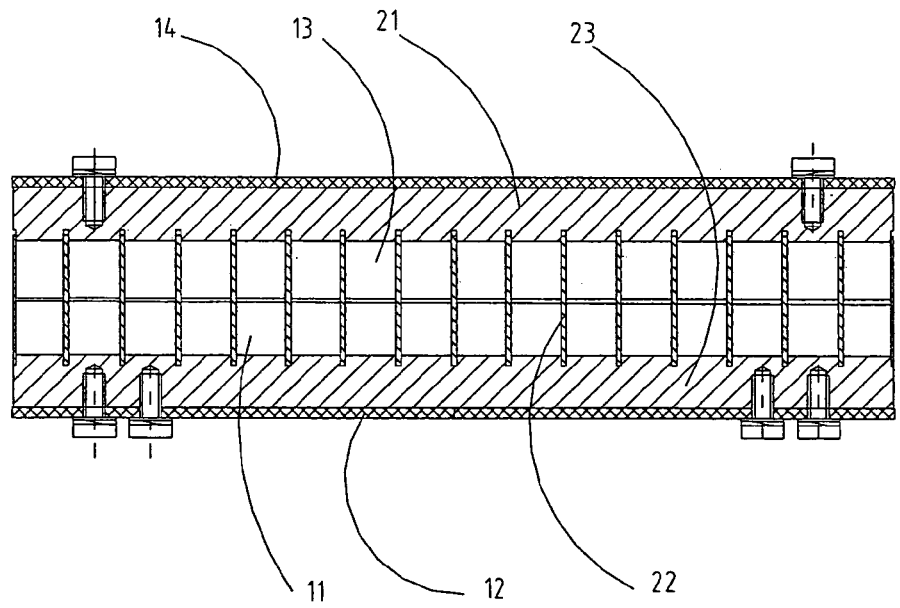
FIG. 3 is a lateral view of an arrangement of a collimator structure and a double array detector.

The solid state detector module structure according to the present invention, referring to FIGS. 1-3, comprises an upper support plate 14 and a lower support plate 12 provided opposing to each other, a collimator 2 provided between the upper support plate 14 and the lower support plate 12 for collimating the incident rays and resisting scatter of incident light beams; and solid state detector arrays provided between the upper support plate 14 and the lower support plate 12 at the rear side of the collimator in the transmitting direction of the rays, preferably the front end edge of the solid state detector arrays being adjacent to the collimator 2. In a preferred embodiment of the present invention, the solid state detector arrays comprise two rows of, i.e., upper and lower, solid state detector arrays 11 and 13. The upper row of detector array 13 is fixed under the upper support plate 14, and the lower row of solid state detector array 11 is fixed on the lower support plate 12. Alternatively, more than 2 rows, such as 2-6 rows, of the solid state detector arrays can be arranged if necessary, for the purpose of increasing the scanning speed of the entire imaging system. Preferably, each row of detectors per se can have identical structure with the single row of detectors in the single row solid state detector array structure module, which is advantageous for applying the existing detector arrays to the double row detector array module structure of the present invention. And compatibilities are also enhanced.

The collimator 2 comprises: an upper groove plate 21 and a lower groove plate 23, with a side of each upper and lower groove plates 21, 23 being engaged with the upper and lower support plates 14, 12 respectively, and the other side thereof provided with mounting grooves; and a plurality of septa 22 provided between the upper and lower groove plates 14, 12 via the mounting grooves and bonded together with super glue or other adhesive. Preferably, each partition plate 22 is formed by heavy metal sheet, and the number of intervals formed by the septa 22 is in correspondence to that of the detectors in the upper and lower rows of solid state detector arrays, so that when the angle of the incident rays with respect to the detectors is zero degree, the spaces formed by the septa in the transmitting direction of the rays are in correspondence to the detector sensitive areas at the rear side, with the septa per se corresponding to the dead areas of the detectors while not blocking the sensitive areas. And each detector can receive the incident light beam passing through the cover plate 22 of the collimator 2.

The solid state detector module structure according to the present invention further comprises a base plate 1; a front pillar 10 and a rear pillar 15 for coupling the upper and lower support plates 14, 12 to the base plate 1. In an embodiment of the present invention, the upper and lower support plates 14, 12 can be the support plates for the Printed Circuit Board (PCB). The upper row of solid state detector array 13 is fixed under the upper support plate 14 which connects with the upper surface of the collimator 2 and the upper end of the rear pillar 15, the lower row of solid state detector array 11 is fixed on the lower support plate 12 which connects with the lower surface of the collimator 2, the front pillar 10 and the lower end of the rear pillar 15. The front pillar 10 and the rear pillar 15 are fixed with the base plate 1, so that the collimator 2 and the upper and lower detector arrays 11, 13 are supported on the base plate 1.

In addition, the solid state detector module structure according to the present invention further comprises a casing 3 provided on the rear pillar 15; a bracket 5 provided in the casing 3; and a circuit board 6 provided on the bracket 5. The shape of the casing 3 is "凵", the bottom end of which is fixed to the base plate 1. And a lead plate 4 for decreasing environmental dosage rate and shielding is provided inside the casing 3. The bracket 5 is provided for fixing the circuit board 6 on the lead plate 4. The upper front end face of the casing 3 is provided with various sockets 7, switch and indicator lamp connected with the circuit board 6. Each socket 7, switch and indicator lamp are used for completing the interconnection among the power supply, signal and solid state detector module as well as the display of the switch state and operation state.

On upper part of the casing 3, an upper cover plate 8 for covering the upper part of the casing 3 can be assembled. The shape of the upper cover plate 8 matches with the upper part of the casing 3 and brings convenience to assembling/disassembling the components in the casing. The upper cover plate is formed into a "∏" shape and snaps tightly on the upper end portion of the casing 3. The rear end face of the casing 3 is provided with a rear cover 9 for the convenience of the assembly/disassembly of the components in the casing.

Figure 4:
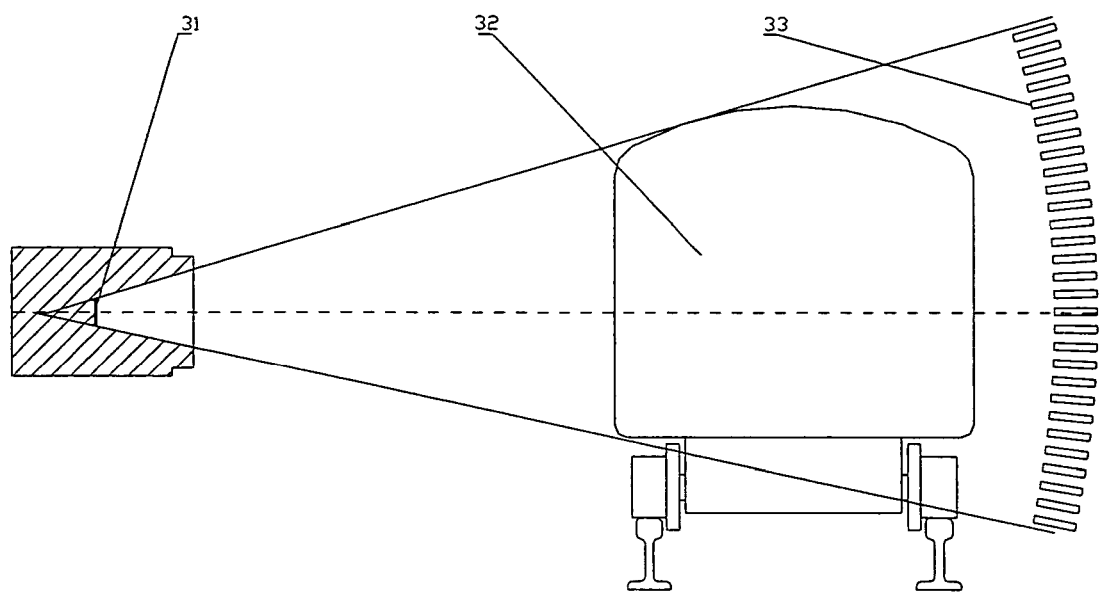
FIG. 4 is a view of usage according to the present invention.

FIG. 4 shows a view in usage for a radiation imaging system having a solid state detector module structure according to the present invention. An accelerator 31 radiates X rays to penetrate through the container/vehicle 32 to be detected. The X rays are received by detector arrays 33 comprising the plurality of solid detectors on the two rows of solid state detector arrays arranged in sector shape or L shape that are arranged on the bracket for the detectors of the container inspection system. The installation of the detector arrays requires that the angle of the incident rays with respect to the detectors approximates to 0 degree, so that clearer images could be satisfactorily obtained.

Although a preferred embodiment has been illustrated and described, it would be appreciated by those persons skilled in the art that the present invention may be made in any other mode without departing from the principles and spirit of the invention as defined by the appended claims of this invention and their equivalent thereof.

The invention claimed is:

1. A solid state detector module structure, comprising:
   an upper support plate and a lower support plate provided opposing to each other,
   a collimator provided between the upper support plate and the lower support plate for collimating incident rays;
   solid state detector arrays provided between the upper support plate and the lower support plate at the rear side of the collimator in the transmitting direction of the rays, wherein the solid state detector arrays comprise an upper row and a lower row, with the upper row of the solid state detector arrays fixed under the upper support plate, and the lower row thereof fixed on the lower support plate,
   a base plate;
   a front pillar and a rear pillar for coupling the upper and lower support plates to the base plate;
   a casing provided on the rear pillar;
   a bracket provided in the casing; and
   a circuit board provided on the bracket.

2. The solid state detector module structure according to claim 1, further comprising: an upper cover plate for covering an upper portion of the casing.

3. A radiation imaging system, comprising the solid state detector module structure according to claim 2.

4. The solid state detector module structure according to claim 1, wherein a rear end face of the casing is provided with a rear cover for the convenience of assembling/disassembling of components in the casing.

5. A radiation imaging system, comprising the solid state detector module structure according to claim 4.

6. The solid state detector module structure according to claim 1, wherein, a lead plate for shielding is provided between an inner wall of the casing and the bracket.

7. A radiation imaging system, comprising the solid state detector module structure according to claim 6.

8. A radiation imaging system, comprising the solid state detector module structure according to claim 1.

9. A solid state detector module structure, comprising:
an upper support plate and a lower support plate provided opposing to each other,
a collimator provided between the upper support plate and the lower support plate for collimating incident rays;
solid state detector arrays provided between the upper support plate and the lower support plate at the rear side of the collimator in the transmitting direction of the rays, wherein the solid state detector arrays comprise an upper row and a lower row, with the upper row of the solid state detector arrays fixed under the upper support plate, and the lower row thereof fixed on the lower support plate,
a base plate;
a front pillar and a rear pillar for coupling the upper and lower support plates to the base plate; and
a casing provided on the rear pillar.

10. The solid state detector module structure according to claim 9, further comprising a bracket provided in the casing.

11. A radiation imaging system, comprising the solid state detector module structure according to claim 10.

12. A radiation imaging system, comprising the solid state detector module structure according to claim 9.

* * * * *